United States Patent
van Velthuizen

(10) Patent No.: US 8,950,876 B2
(45) Date of Patent: Feb. 10, 2015

(54) LARGE VEHICLE SIDE VIEW MIRROR SHIELD

(71) Applicant: Ellie van Velthuizen, Brighton (CA)

(72) Inventor: Ellie van Velthuizen, Brighton (CA)

( * ) Notice: Subject to any disclaimer, the term of this patent is extended or adjusted under 35 U.S.C. 154(b) by 233 days.

(21) Appl. No.: 13/654,027

(22) Filed: Oct. 17, 2012

(65) Prior Publication Data

US 2014/0036366 A1     Feb. 6, 2014

(51) Int. Cl.
*G02B 1/00* (2006.01)

(52) U.S. Cl.
USPC .......................................................... 359/507

(58) Field of Classification Search
CPC ...... B60Q 1/2665; B60R 1/1207; B60R 1/12; B60R 1/0602
USPC .................... 359/507, 267; 362/494
See application file for complete search history.

(56) References Cited

U.S. PATENT DOCUMENTS 5,421,628 A * 6/1995 Nahm ........................... 359/507
D620,859 S * 8/2010 Bisson ......................... D12/187

* cited by examiner

*Primary Examiner* — Euncha Cherry
(74) *Attorney, Agent, or Firm* — SoCal IP Law Group LLP; John E. Gunther

(57) ABSTRACT

A shield for a vehicle side view mirror comprises a main deflector body forming a hood with a lip extending from the deflector body configured to abut a surface of the minor. In a preferred embodiment a secondary deflector body extends rearwardly from the main deflector body opposite the lip. When the lip is attached to the mirror the shield is interposed in a space between the windshield and a reflective surface of the mirror, to deflect water and debris being cleared from the windshield thereby shielding the reflective surfaces of the mirror.

2 Claims, 4 Drawing Sheets

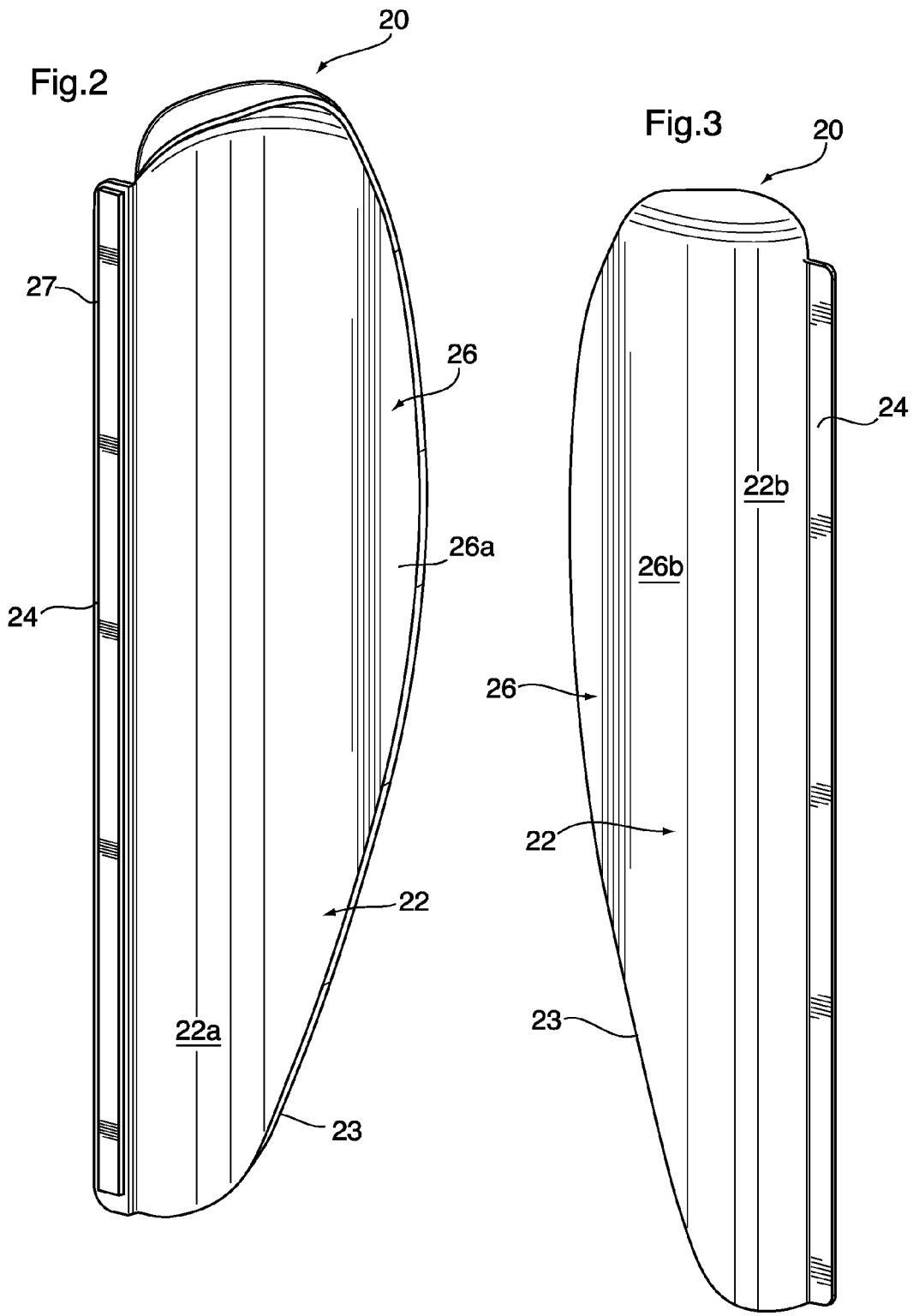

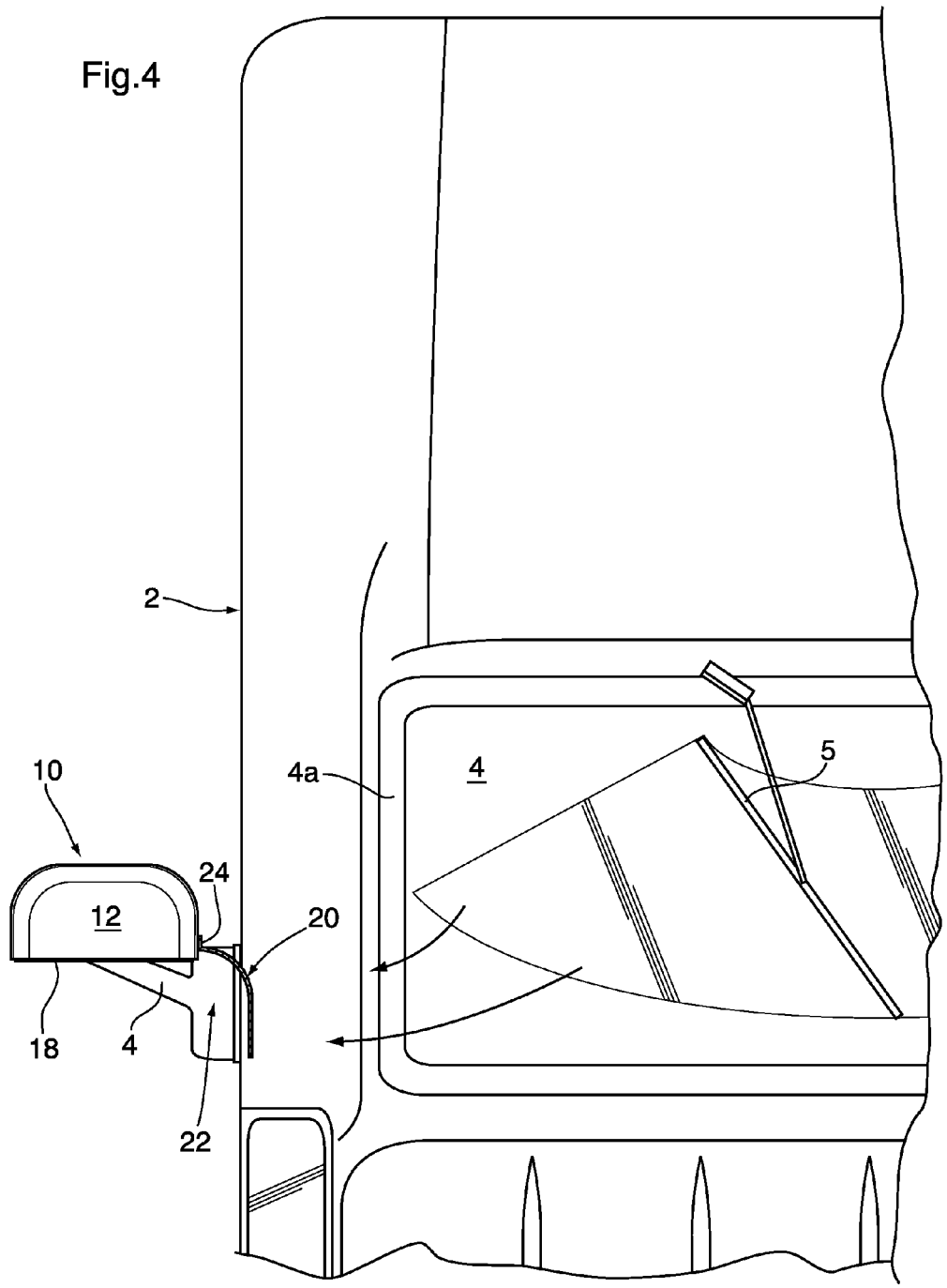

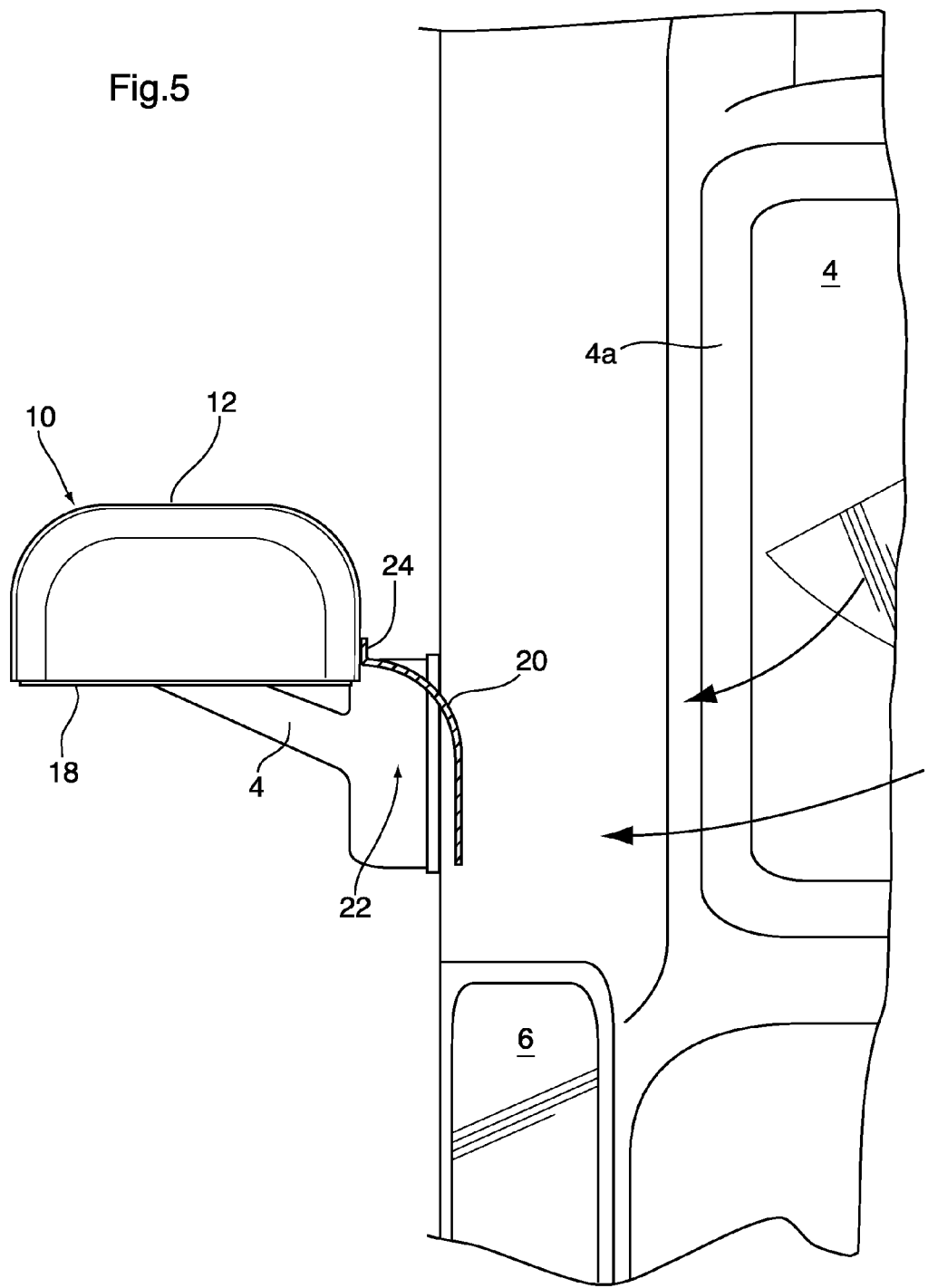

LARGE VEHICLE SIDE VIEW MIRROR SHIELD

RELATED APPLICATION INFORMATION

This application claims the benefit of priority to Canadian Patent Application No. 2,783,853, filed Aug. 1, 2012, of which full contents are incorporated herein by reference.

FIELD OF THE INVENTION

This invention relates to automotive vehicles.

BACKGROUND OF THE INVENTION

Automotive vehicles, and particularly trucks and buses of varying sizes, are commonly used to transport goods, passengers, and for other purposes. In the case of larger vehicles, for example buses and tractor trailers, the driver may have an obstructed view out of the rear of the vehicle, or no rear view at all. For example, in the case of a tractor trailer the trailer blocks the driver's view through the rear view of the cab; in many buses, no rear view window is provided. In these and other vehicles having a limited or obstructed view from the driver's seat through the rear of the vehicle, the side view minors are extremely important for safe and defensive driving.

In order to determine when it is safe to change lanes, and for other driving manoeuvres, the driver of the vehicle must have a clear and unobstructed view to the rear along the sides of the vehicle. This is provided by the side view mirrors. Accordingly, in such large vehicles, for example commercial vehicles such as trucks, motor coaches and heavy equipment trucks (for example dump trucks); and other large vehicles such as recreational vehicles and the like, the side view minors are typically fairly large, and often consist of two parts: an upper part which is a standard planar reflective minor, and a lower part which is a convex or "wide angle" minor allowing the driver a broader field of view rearwardly along the sides of the vehicle.

Because of the position of the driver in the driver's seat, the side view mirrors are mounted immediately adjacent to the side edges of the windshield of the vehicle, typically forwardly of the driver to minimize the degree to which the driver must turn his or her head in order to see the image in the mirror. In this position the mirrors can be angled such that the driver has a full field of view rearwardly along the sides of the vehicle, but without obstructing the driver's forward view out of the windshield of the vehicle.

For safe driving, the windshield needs to be kept clear of water in its various phases (for example falling rain, ice or snow, or accumulated rain, ice or snow sprayed up from the road by a vehicle in front of the large vehicle) and debris (for example grit, stones or other particulate or granular matter) kicked up by a vehicle travelling in front of the large vehicle. This is accomplished by reciprocating windshield wipers, which are pivotally anchored either at the base or at the top of the windshield, and have an elastomeric wiper pressing against the windshield. As the windshield wipers pivot from side to side, the wiper clears the windshield by sweeping water and debris off to the sides of the windshield.

This causes the problem that as the windshield is cleared, the water and/or debris are swept toward the side view mirrors by the windshield wipers. Because of the angle at which each side view mirror must be positioned in order to reflect light from the rear of the vehicle toward the driver's seat, the reflective surface of the minors are exposed to the water and debris being cleared from the windshield by the windshield wipers. The constant bombardment, and potentially accumulation, of water and/or debris on the reflective surface of the minors renders driving unsafe in many circumstances, particularly during heavy rainfalls or snowfalls; or on wet or debris-laden roads where the water and debris are sprayed onto the front of the large vehicle by vehicles driving immediately ahead of the large vehicle.

BRIEF DESCRIPTION OF THE DRAWINGS

In drawings which illustrate by way of example only a preferred embodiment of the invention.

FIG. 2 is an elevation of the side view minor shield of FIG. 1.

FIG. 3 is an elevation of the side view minor shield taken opposite FIG. 2.

FIG. 4 is a top plan view showing the manner in which the side view mirror shield shields the side view mirror from water and/or debris being cleared from the windshield of the vehicle.

FIG. 5 is a cross sectional top plan view of the minor of FIG. 4.

DETAILED DESCRIPTION OF THE INVENTION

Figure 1:
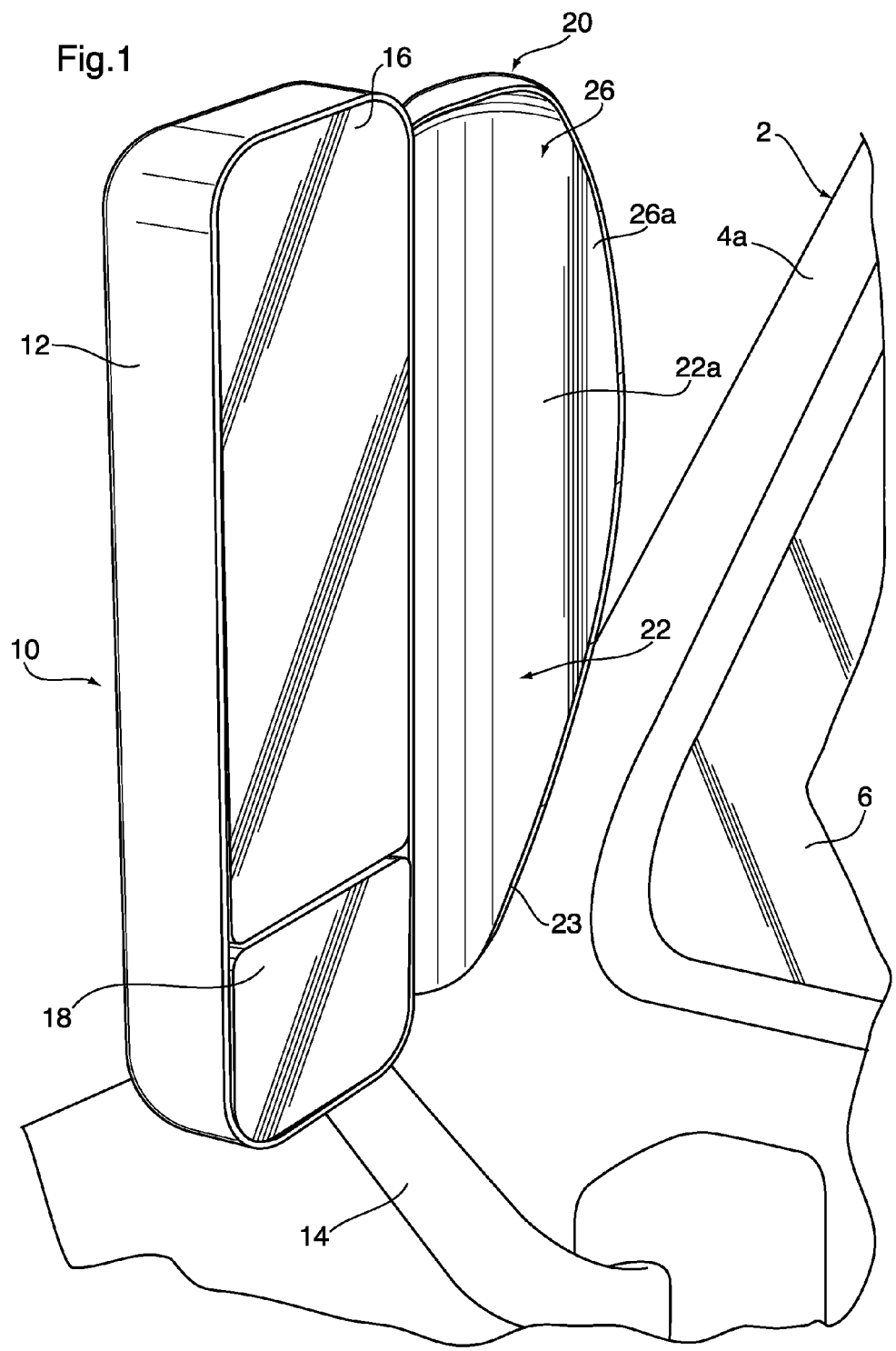
FIG. 1 is a perspective view of a side view mirror shield according to the invention mounted to the side view minor of a vehicle.

The invention provides a shield for a vehicle side view minor, the minor being affixed to a motor vehicle adjacent to a windshield of the vehicle, in a position where the mirror is exposed to water and debris cleared off of the windshield, and forwardly of a driver of the vehicle, the shield comprising a substantially rigid main deflector body forming a hood having a rearwardly facing concavity, and a lip extending from the deflector body, the lip being configured to abut a surface of the mirror such that when the lip is attached to the minor the main deflector body is interposed into a space between the windshield and at least one reflective surface of the mirror, whereby the shield deflects the water and debris being cleared from the windshield to shield the at least one reflective surface of the minor from the water and debris.

In a further embodiment he shield further comprises a substantially rigid secondary deflector body extending rearwardly from the main deflector body opposite the lip along a portion of the main deflector body.

FIG. 1 illustrates a portion of a motor vehicle, in the example shown a truck 2 having a windshield 4 and a side view mirror 10. The invention is particularly advantageously used on large vehicles, including for example commercial vehicles and large personal vehicles such as recreational vehicles, however the invention is suitable for use on motor vehicles in general.

The side view mirror 10 illustrated, by way of example only, comprises a casing 12 mounted to an arm 14 immediately adjacent to the side edge of the windshield 4, defined by a pillar 4a. The casing 12 of the side view mirror 10 conventionally contains a back plate (not shown) to which the minor or minor portions are affixed. In the embodiment illustrated the minor 10 comprises two mirror portions: a planar minor 16 disposed above a convex mirror 18 which provides a wider angle field of view than the planar minor 16. The side view minor 10 is positioned such that the driver sitting in a typical driving position and looking out of the driver's side window 6 sees a reflection of the rear along the side of the vehicle 2 off of the planar minor 16, and a wider angle reflection along the side of the vehicle 2 off of the convex mirror 18. Thus, the casing 12 protects the mirror from water and debris approaching the vehicle 2 from the front of the vehicle 2.

However, as can be seen in FIG. 4, because of the position of the side view minors 10 slightly forwardly of the windshield and the angle at which the side view mirror 10 must be disposed in order to give the driver the optimal field of view alongside the vehicle 2, the reflective surfaces of the minors 16, 18 are susceptible to water and debris being cleared from the windshield 4.

A side view minor shield 20 according to the invention, illustrated in FIGS. 2 and 3, comprises a substantially rigid main deflector body 22 having a concave surface 22a facing the side view mirror 10 and a complementary convex surface 22b, forming a deflecting hood when mounted as illustrated. The convex surface facilitates the deflection of water and debris away from the minor 10, since the water and debris will readily fall off of the convex surface 22b and away from the vehicle 2. The main deflector body 22 is preferably taller than the side view minor 10, so that it extends slightly above the top of the side view minor 10 and slightly below the bottom of the side view minor 10. The main deflector body 22 is configured to shield the reflective surfaces of mirrors 16, 18 without obstructing the driver's view of the reflective surfaces of minors 16, 18, as shown in FIGS. 4 and 5.

The deflector 20 preferably comprises a lip 24 extending from the main deflector body 22, the lip 24 being configured to abut a surface of the side view mirror 10 such that when the lip 24 is attached to the side view mirror 10 the main deflector body 22 is interposed into the space between the windshield 4 and the reflective surfaces of the minors 16, 18. The lip 24 may extend partially or fully along the height of the main deflector body 22, as long as sufficient surface area of the lip can contact the selected mounting surface of the minor 10 (for example the side of the casing 12 facing the vehicle 2) to maintain the shield 20 securely in position. This may depend on the manner in which the shield 20 is affixed to the minor 10, as described further below. For side view mirrors which do not have a casing (not shown), the shield 20 may be affixed to a side edge or behind the backplate, or to any other convenient location.

In a preferred embodiment a substantially rigid secondary deflector body 26 extends rearwardly from the main deflector body 22 along at least a portion of an edge 23 laterally opposite to the lip 24. The secondary deflector body 26 also preferably comprises a concave surface 26a facing the side view mirror 10 and a complementary convex surface 26b, forming a deflecting hood. In the preferred embodiment the secondary deflector body 26 extends along only a portion of the edge 23 of the main deflector body 22, as illustrated along an upper portion thereof, to provide additional shielding protection for the side view minor 10 without obscuring the driver's view of the mirrors 16, 18.

Preferably the lip 24 and secondary deflector body 26 are formed integrally with the main deflector body 22 to produce a unitary shield as shown. Alternatively, the secondary deflector body 26 may be formed independently of the main deflector body 22 and affixed thereto by any suitable means including, depending upon the composition of the shield 20, adhesive tape, epoxy or other chemical adhesives, welding, bonding etc. without limitation. The lip 24 likewise may alternatively be formed separately from the main deflector body 22 and affixed thereto by any suitable means, including adhesive tape, epoxy or other chemical adhesives, welding, bonding etc. without limitation. It may be desirable to be able to adjust the position of the secondary deflector body 26 relative to the main deflector body 22, in which case it is preferably removably affixed along the edge 23 of main deflector body 22.

The components of the side view mirror shield 20 may be formed from (preferably light weight) metal, plastic, or any other material that is suitably rigid and capable of withstanding the force of water and debris, not only swept toward the shield 20 by the windshield wipers 5, but contacting the shield directly from the environment at the speeds at which such large vehicles normally travel, and wind at such speeds. Preferably the shield 20 is formed from 0.6 ml or 0.8 ml plastic (for example Mylar), optionally chrome plated or otherwise coated for aesthetic purposes. The side view minor shield 20 may be formed by any suitable process, including without limitation, depending upon the material selected for the shield 20, injection or other plastic molding, and metal forming.

In operation, the shield 20 according to the invention is mounted generally vertically along the inner side wall of the side view minor casing 12 using adhesive tape, or more permanent means such as epoxy, screws or other types of fasteners or any other suitable attachment means. In the embodiment shown the lip 24 is affixed to the casing 12 by 3M double-sided tape 27 sold under the name 'Two-Way Foam Tape for Automotive and Industrial Purposes', however many other adhesive materials and securing means are suitable for this purpose. The lip 24 is configured to abut the side surface of the casing 12, in the preferred embodiment substantially along the vertical length thereof, in order to provide optimal versatility for adhering or securing the shield 20 to the mirror 10. In other embodiments, the shield 20 may be formed integrally with the casing 12, or any other convenient component, of the side view minor 10. If formed from metal the shield 20 is preferably affixed to the mirror 10 by very secure means such as rivets or other fasteners to ensure that the shield 20 does not detach while the vehicle 2 is moving.

As the motor vehicle 2 is in motion and subjected to adverse weather conditions, water spray or debris from the road, the driver may activate the windshield wipers 5 to clear the debris. As the windshield wipers 5 clear water and/or debris off to the side of the windshield 4, some portion of the water and/or debris is washed or forced off of the windshield 4 toward the side view minor 10, as shown by the arrows in FIGS. 4 and 5. One or both of the main deflector body 22 and the secondary deflector body 26, deflects such water and/or debris away from the mirrors 16, 18. The water and/or debris strikes the convex surface of the main deflector body 22 and/or the secondary deflector body 26 and falls to the ground, the shield 20 thus preventing the water and/or debris from striking and potentially accumulating on the mirrors 16, 18.

Various embodiments of the present invention having been thus described in detail by way of example, it will be apparent to those skilled in the art that variations and modifications may be made without departing from the invention.

What is claimed is:

1. A shield for a vehicle side view mirror, the mirror being affixed to a motor vehicle adjacent to a windshield of the vehicle, in a position where the mirror is exposed to water and debris cleared off of the windshield, and forwardly of a driver of the vehicle, the shield comprising a substantially rigid main deflector body forming a hood having a rearwardly facing concavity, and
a lip extending from the deflector body, the lip being configured to abut a surface of the mirror such that when the lip is attached to the mirror the main deflector body is interposed into a space between the windshield and at least one reflective surface of the minor, whereby the shield deflects the water and debris being cleared from the windshield to shield the at least one reflective surface of the minor from the water and debris.

2. The shield of claim 1 further comprising a substantially rigid secondary deflector body extending rearwardly from the main deflector body opposite the lip along a portion of the main deflector body.

\* \* \* \* \*

UNITED STATES PATENT AND TRADEMARK OFFICE
CERTIFICATE OF CORRECTION

PATENT NO. : 8,950,876 B2
APPLICATION NO. : 13/654027
DATED : February 10, 2015
INVENTOR(S) : Ellie van Velthuizen It is certified that error appears in the above-identified patent and that said Letters Patent is hereby corrected as shown below:

Title page, line 3 of item (57) Abstract replace "minor" with --mirror--.

In the Specification

Column 1, lines 26 and 36: replace "minors" with --mirrors--; lines 38 and 39 replace "minor" with --mirror--; line 67 replace "minors" with --mirrors--.

Column 2, line 4: replace "minors" with --mirrors--; lines 15, 17, 19 and 25 replace "minor" with --mirror--; lines 31, 38, 43, 59, 60, 61, 63, 64 and 67 replace "minor" with --mirror--.

Column 3, lines 5 and 8: replace "minors" with --mirrors--; lines 11, 17, 20, 21, 22, 34 and 37 and 52 replace "minor" with --mirror--; lines 25 and 31 replace "minors" with --mirrors--.

Column 4, lines 13, 19, 32 and 42: replace "minor" with --mirror--.

In the Claims

Column 5, line 3, Claim 1: replace "minor" with --mirror--.

Signed and Sealed this
Thirtieth Day of June, 2015

Michelle K. Lee
*Director of the United States Patent and Trademark Office*